Oct. 8, 1946.  J. P. CROWLEY  2,409,108
PROCESS OF FORMING GLASS PRISMS
Filed Nov. 2, 1942  2 Sheets-Sheet 1

Inventor
JOSEPH P. CROWLEY.
By Frank Fraser
Attorney

Oct. 8, 1946.   J. P. CROWLEY   2,409,108
PROCESS OF FORMING GLASS PRISMS
Filed Nov. 2, 1942   2 Sheets-Sheet 2

Inventor
JOSEPH P. CROWLEY.
By
Frank Fraser
Attorney

Patented Oct. 8, 1946

2,409,108

UNITED STATES PATENT OFFICE 2,409,108

PROCESS OF FORMING GLASS PRISMS

Joseph P. Crowley, Toledo, Ohio, assignor to Libbey-Owens-Ford Glass Company, Toledo, Ohio, a corporation of Ohio Application November 2, 1942, Serial No. 464,174

3 Claims. (Cl. 51—283)

The present invention relates to glass prisms and to the processing thereof.

More particularly, the invention has to do with the surfacing of solid glass prisms of the isosceles triangle type such as are used in various optical instruments; for example, range finders, panoramic sights, periscopes, binoculars, etc. In order to obtain maximum optical precision and definition of the image reflected by the prisms it is not only essential that the prisms be produced of high quality glass substantially free from defects, but also that they be accurately formed both as to size and shape.

It is customary in making solid glass prisms to saw or otherwise cut out the prism blanks from blocks or plates of optical glass or to press out blanks of the approximate shape and size required, after which the prism faces are ground and polished.

According to this invention, the prism blanks are cut from sheets or plates of glass preferably rolled and having at least one finished ground and polished surface which forms one face of the prism, after which the other two faces of the prism are ground and polished. This method of forming the prisms offers many advantages; first, because of the comparative speed, economy and ease of producing rolled glass, and second, because by cutting the prism blank so that one face thereof is formed by a finished surface of the rolled sheet or plate, this face will not have to be ground and polished after cutting.

It is an object of this invention to provide an improved process and apparatus for grinding and polishing the prism blanks after they have been cut from the glass sheet or plate whereby the finished prism will be accurately formed as regards both the size and shape thereof.

Another object of the invention is to provide an improved process and apparatus whereby a relatively large number of prism blanks can be simultanously ground and polished in a single grinding and polishing operation, rapidly, accurately and economically.

A further object of the invention is to provide an improved process and apparatus wherein the prism blanks are supported in such a manner that they will be securely held in proper position against displacement during the surfacing operations and also in which first the grinding and then the polishing of one face of the blanks may be accomplished without disturbing the relative positions thereof.

Other objects and advantages of the invention will become more apparent during the course of the following description, when taken in connection with the accompanying drawings.

In the drawings, wherein like numerals are employed to designate like parts throughout the same:

As pointed out above, the present invention is particularly concerned with the processing of simple isosceles triangle prisms and further that the prism blanks are preferably cut from rolled sheets or plates of glass having at least one ground and polished surface which forms one face of the finished prism.

Figure 1:
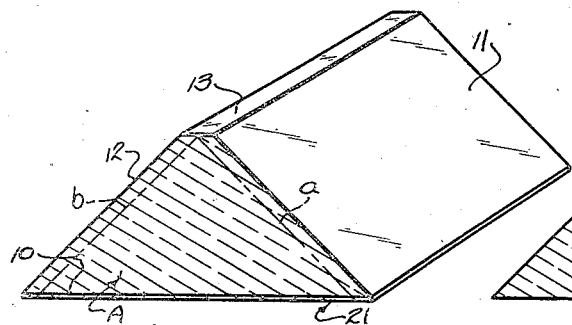
Fig. 1 is a perspective sectional view of a prism blank which is to be processed according to this invention.
Figure 2:
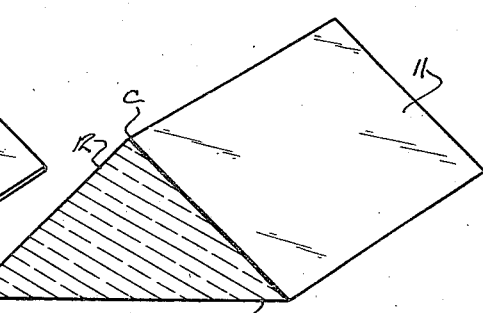
Fig. 2 is a similar view of a finished prism.
Figure 10:
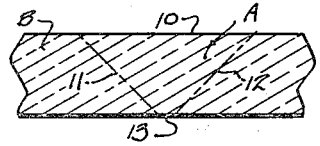
Fig. 10 is a transverse section showing the way in which the prism blanks are cut from a glass sheet or plate.

With reference now to the drawings, there is illustrated in Fig. 1 a prism blank A substantially triangular in cross section and in Fig. 2 a finished prism. One method by which the prism blank may be cut from a sheet or plate of rolled glass is shown by way of example in Fig. 10. The glass sheet B can be rolled in accordance with any preferred method and at least one surface thereof is ground and polished before the prism blanks are cut therefrom. The prism blank A is cut from the glass sheet B in such a manner that the hypothenuse face 10 thereof is parallel with and formed by a finished surface of the glass sheet B. The two side faces 11 and 12 of the prism extend transversely of the glass sheet at angles of 45° and terminate in a relatively narrow flat face 13 formed by the opposite surface of the glass sheet.

After the prism blank A has been cut from the glass sheet B the side faces 11 and 12 thereof are adapted to be ground and polished in accordance with this invention. To permit this grinding and polishing of the side faces 11 and 12, the prism blank, when cut from the glass sheet, is oversize, and upon grinding and polishing thereof, those portions of the blank outwardly of the broken lines a and b in Fig. 1 will be removed to produce a finished prism in which the side faces 11 and 12 converge to a sharp edge c as shown in Fig. 2.

In Figs. 3 to 9 is disclosed a preferred form of apparatus which has been successfully employed in grinding and polishing the faces 11 and 12 of the prism blanks and by the use of which the said faces may be accurately ground and polished to produce a prism having a predetermined shape and size and in which the side faces 11 and 12 extend at exactly 45° angles to the base or hypothenuse face 10.

Figure 3:
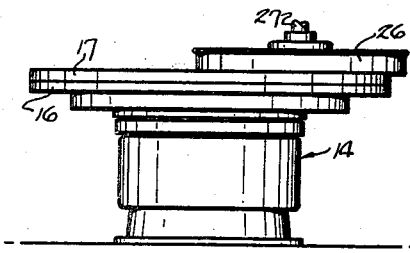
Figs. 3 and 4 are side elevations respectively of a grinding machine and a polishing machine upon which the prisms are processed.
Figure 4:
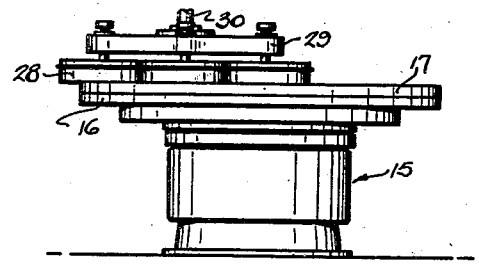
Figure 5:
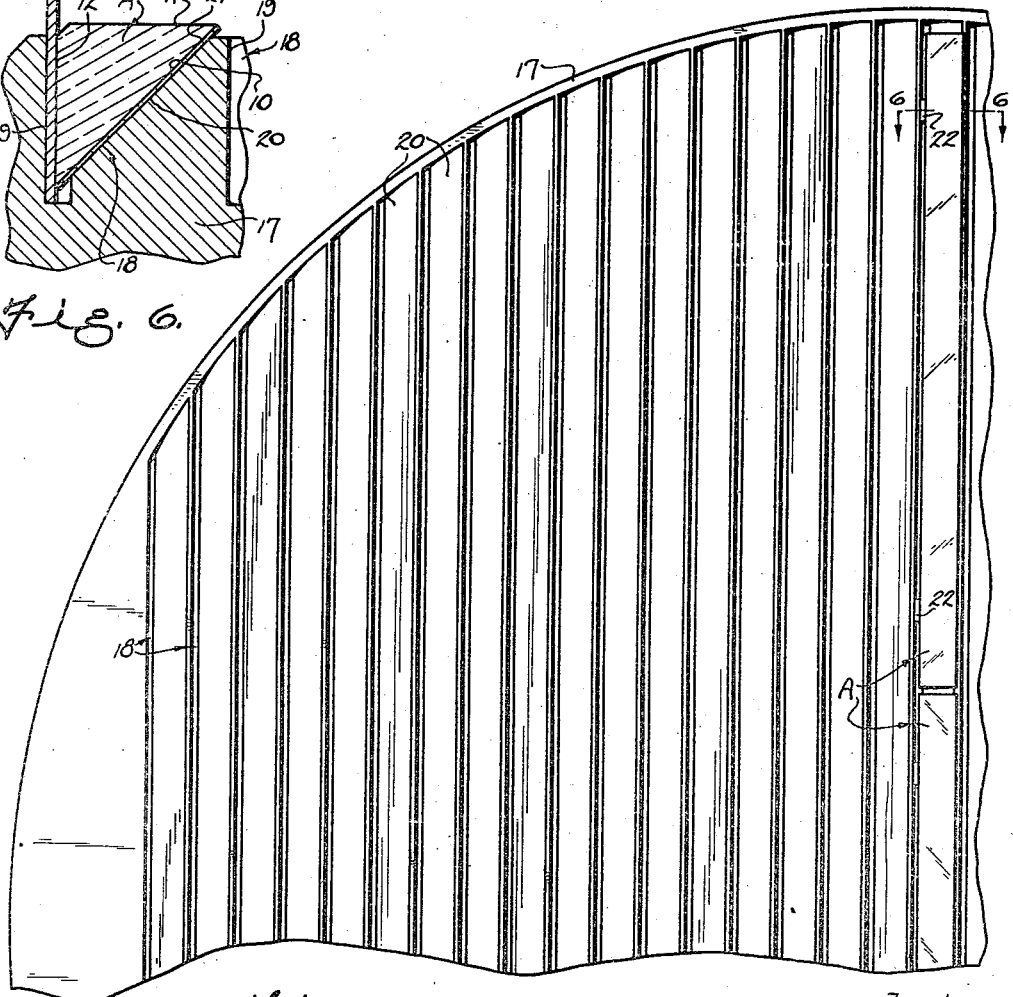
Fig. 5 is a plan view of the removable top of the grinding or polishing machine showing a plurality of prism blanks carried thereupon.

In carrying out the invention, the grinding and polishing operations may be performed on any suitable type of grinding and polishing machines 14 and 15 respectively as shown in Figs. 3 and 4. Each machine comprises a horizontal rotatable table 16 provided with a removable top 17 constituting the support for the prism blanks A to be surfaced. Each removable table top 17 consists of a relatively large metal disk provided in its upper surface with a plurality of relatively long, parallel recesses 18, each being defined by a vertical side wall 19 and an opposed inclined wall 20 extending at an angle of 45° with respect to vertical wall 19. A plurality of prism blanks A in the form of relatively long bars are mounted within the recesses 18 as shown in Fig. 5 and one side face thereof ground and polished, after which the position of the blanks is reversed and the other side face ground and polished.

Figure 7:
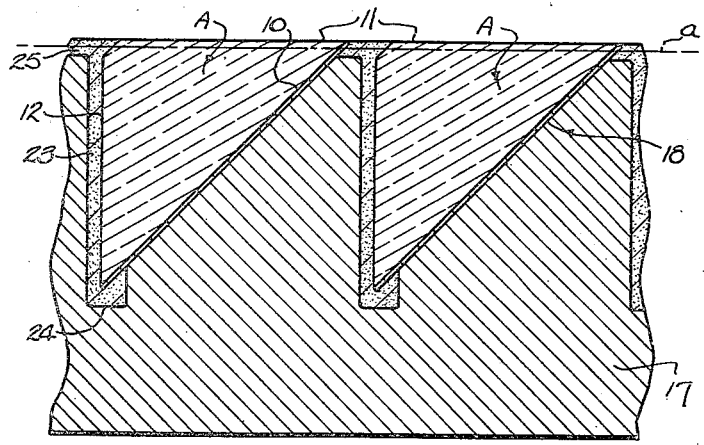
Figs. 7 and 8 are transverse sections through a portion of the removable top showing the mounting of the prism blanks.
Figure 9:
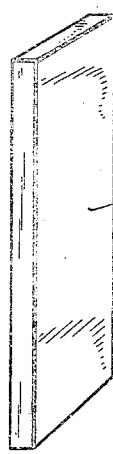
Fig. 9 is a perspective view of one of the spacer plates used for accurately positioning the prism blanks upon the removable top.
Figure 6:
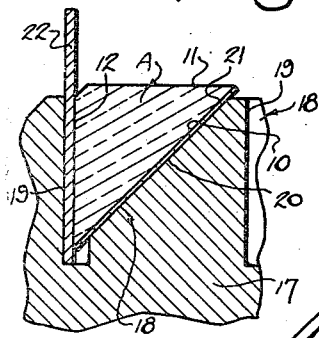
Fig. 6 is a detail transverse section taken substantially on line 6—6 of Fig. 5.

In grinding the prism blanks, the finished hypothenuse face 10 of each blank is preferably covered with a protecting layer of masking tape or the like 21, after which the blank is placed in one of the recesses 18 in table top 17 with the covered hypothenuse face being laid flat against the inclined wall 20 of the recess. The hypothenuse face 10 of the blank is then wedged against the inclined wall 20 of the recess, with the upper side face 11 thereof disposed in a horizontal plane and projecting the required distance above the table top as shown in Fig. 6. The blank is wedged in place by the use of two or more metal spacer plates 22 which are inserted within the space between the vertical wall 19 of the recess and the side face 12 of the prism blank. When the blank has thus been properly positioned within the recess, the space between the prism and vertical wall 19 of said recess is filled with plaster of Paris or other suitable cement 23 as shown in Fig. 7. The plaster also fills the enlarged portion 24 at the bottom of the recess and likewise extends upwardly to the horizontal face 11 of the blank as at 25, so that the said blank is firmly secured in place. After the plaster has set, the spacer plates 22 are removed and the resulting openings also filled with plaster.

Prism blanks A are preferably mounted in all of the recesses 18 with the faces 11 thereof disposed in a common horizontal plane. The table top is then placed upon the grinding machine 14 and the faces 11 of the prism blanks simultaneously ground, with the glass being removed down to the line a in Fig. 7 which results in the removal of approximately one-half of the width of the narrow face 13 at the apex of the prism blank. The grinding of the blanks may be effected by the use of a conventional type grinding runner 26 rotatably carried at the lower end of a vertical shaft 27, suitable abrasive material being supplied to the runner in the usual manner. After the blanks have been ground upon grinding machine 14, the table top 17 is transferred to the polishing machine 15 and the upper faces of the blanks polished such as by means of the rotatable polishing runners 28 mounted upon a frame 29 carried at the lower end of a vertical shaft 30. Rouge or other polishing material may be used in conjunction with the polishing runners in the customary manner.

In accordance with the invention, the vertical wall 19 and inclined wall 20 of each recess 18 are accurately machined so that the inclined wall 20 extends at exactly a 45° angle to the vertical wall 19. Likewise, the opposite surfaces of the spacer plates 22 are also accurately machined. Since the hypothenuse faces 10 of the prism blanks are already ground and polished, due to the manner in which they are cut from the glass sheet B in Fig. 10, it will be readily seen that when the hypothenuse faces are placed flat against the inclined walls 20 of the recesses the side faces 11 of the blanks, upon being ground and polished, will lie in a horizontal plane and will extend at exactly a 45° angle with respect to the hypothenuse faces 10.

Figure 8:
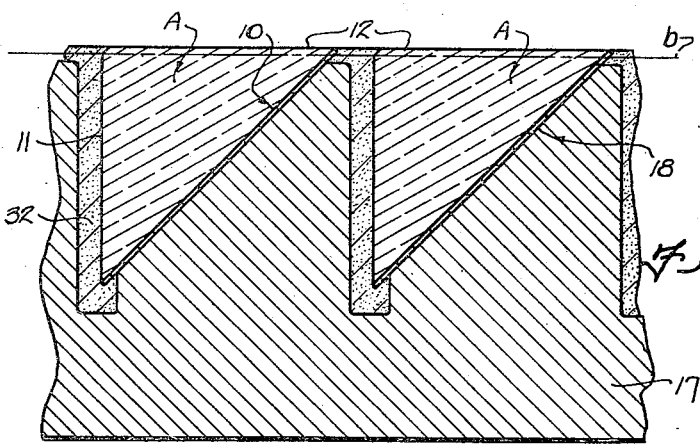

After the side faces 11 of the blanks have been ground and polished, the blanks are removed from the table top, the plaster cleaned from the recesses, and the blanks again secured in the said recesses with the side faces 12 thereof disposed in a common horizontal plane as shown in Fig. 8. The blanks are wedged within the recesses 18 by the use of metal spacer plates 31 and the said recesses then filled with plaster of Paris or the like 32 to secure the said blanks in place in the manner above described. It will be noted that the spacer plates 31 are relatively thicker than spacer plates 22 and this additional thickness is necessary in order to compensate for the removal of the glass incident to the grinding of the side faces 11.

The side faces 12 of the prism blanks are then ground and polished in the manner above described, with the said faces being ground down to the point indicated by the line b in Fig. 8 which is also equal to one-half the width of the narrow flat face 13. This results in the two side faces 11 and 12 of the finished prism converging to a sharp edge c as shown in Fig. 1. After grinding of the side faces 11 and 12, the prism blanks are cut transversely into prisms of the desired length which are then ready for use. The end faces of the prisms may or may not be ground and polished as desired. By the practice of the above process, solid glass prisms of the type described having a predetermined size and shape can be rapidly and accurately produced. Also, by employing separate grinding and polishing machines and removable table tops therefor interchangeable with one another, one set of blanks may be ground upon the grinding machine while a second set of blanks is being polished upon the polishing machine. The spacer plates 22 and 31 serve the dual purpose of properly positioning the prism blanks within the recesses and causing the side faces 11 and 12 to be ground and polished to project a predetermined distance above the table top so that the upper faces of the prism blanks are disposed in a common horizontal plane.

It is to be understood that the form of the invention herewith shown and described is to be taken as a preferred embodiment of the same, and that various changes in the shape, size and

I claim:

1. In apparatus for the processing of solid glass prisms having a hypothenuse face and two side faces extending at angles of 45° with respect thereto, a recessed table for supporting the prism blanks during grinding and polishing, said recess having an accurately machined inclined wall for receiving the hypothenuse face of the prism blank and an accurately machined vertical wall, and removable spacers adapted to be inserted between the vertical wall of the recess and a side wall of said prism blank to properly position the said prism blank within said recess and the side face thereof to be ground and polished a predetermined distance above the top of the supporting table.

2. In apparatus for the processing of solid glass prism blanks having a hypothenuse face and two side faces extending at angles with respect thereto, a recessed table for supporting said blanks during grinding and polishing, said recess having an accurately machined inclined wall for receiving the hypothenuse face of the prism blank and an accurately machined substantially vertical wall, and spacing means adapted to be inserted between the substantially vertical wall of the recess and a side wall of said prism blank to properly position the said blank within said recess with the side face thereof to be ground and polished above the top of the supporting table.

3. In apparatus for the processing of solid glass prisms having a hypothenuse face and two side faces extending at angles of 45° with respect thereto, a recessed table for supporting the prism blanks during grinding and polishing, said recess having an accurately machined inclined wall for receiving the hypothenuse face of the prism blank and an accurately machined vertical wall, a set of removable spacer means adapted to be inserted between the vertical wall of the recess and an unfinished side wall of said prism blank to position the said blank within said recess with the side face thereof to be ground and polished above the top of the supporting table, and a second set of accurately machined removable spacer means adapted to be inserted between the vertical wall of the recess and a finished side wall of said prism blank to properly position the said blank within said recess with the side face thereof to be ground and polished a predetermined distance above the top of the supporting table.

JOSEPH P. CROWLEY.